United States Patent [19]

Hafele

[11] Patent Number: 4,468,368
[45] Date of Patent: Aug. 28, 1984

[54] METHOD FOR TRANSPORTING SECTIONAL MOLDS

[75] Inventor: Robert X. Hafele, Ann Arbor, Mich.

[73] Assignee: Hoover Universal, Inc., Ann Arbor, Mich.

[21] Appl. No.: 348,730

[22] Filed: Feb. 16, 1982

[51] Int. Cl.³ .......................................... B29C 17/07
[52] U.S. Cl. .................................. 264/530; 264/523; 264/533; 264/542; 264/294; 264/296; 264/320; 425/525; 425/530; 425/532; 425/534; 425/541; 425/451
[58] Field of Search ............... 264/523, 530, 542, 543, 264/294, 296, 320, 533; 425/322, 530, 532, 534, 541, 451, 525

[56] References Cited

U.S. PATENT DOCUMENTS

| | | | |
|---|---|---|---|
| 2,792,591 | 5/1957 | Cardot | 18/5 |
| 3,079,631 | 3/1963 | Gasmire | 18/5 |
| 3,267,184 | 8/1966 | Nowicki | 264/97 |
| 3,348,267 | 10/1967 | Novel | 425/541 X |
| 3,351,980 | 11/1967 | Hehl | 18/5 |
| 3,491,404 | 1/1970 | Mehnert | 18/5 |
| 3,635,635 | 1/1972 | Moslo | 425/326 |
| 3,642,410 | 2/1972 | Bourgeois | 425/326 |
| 3,685,943 | 8/1972 | Fischer | 425/326 |
| 3,690,808 | 9/1972 | Pechtold | 425/326 |
| 3,734,671 | 5/1973 | Talasz | 425/450 |
| 3,778,210 | 12/1973 | Heath | 425/242 |
| 3,796,530 | 3/1974 | Kontz | 425/305 |
| 3,829,264 | 8/1974 | Mnilk | 425/149 |
| 3,924,987 | 12/1975 | Mehnert | 425/451 |
| 3,924,995 | 12/1975 | Crooks | 425/243 |
| 3,944,642 | 3/1976 | Uhlig | 264/530 |
| 3,972,669 | 8/1976 | Mehnert | 425/532 X |
| 4,259,056 | 3/1981 | Rees | 425/533 |
| 4,260,358 | 4/1981 | Mehnert | 425/532 |

*Primary Examiner*—Jan H. Silbaugh
*Attorney, Agent, or Firm*—Arnold, White & Durkee

[57] ABSTRACT

A method and apparatus are disclosed for transferring blanks, plastic parisons or other articles to be molded in a sealed cavity. One embodiment includes mold sections which are closeable along a first axis to form a mold cavity and which are movable along a second axis from a first station where the mold sections may receive a moldable blank to a second station where the blank may be molded under pressure. Optional biasing means may be included to hold the mold sections sufficiently close together to hold the blank in the mold cavity as the mold sections move from the first station to the second station. A clamp, or other pressure applying means, exerts a final closing pressure on the mold sections at the second station for molding the blank under pressure. The clamp is stationary in relation to the first and second stations so that the mold sections can move relative to the clamp along the second axis. In another embodiment the method includes the steps of transporting mold sections generally along a first axis to a first station; moving the mold sections generally along a second axis while at the first station to close the molds around a blank sufficiently to encapsulate the blank in an interior cavity formed by the mold sections; transporting the blank in the mold cavity to a second station by moving the closed mold sections along said first axis; and exerting a force on the mold sections at the second station to form a proper seal for molding, the force being exerted from a source which is stationary in relation to the first and second stations.

5 Claims, 2 Drawing Figures

METHOD FOR TRANSPORTING SECTIONAL MOLDS

BACKGROUND OF THE INVENTION

This invention relates generally to a method and apparatus for transferring blanks, plastic parisons, or other moldable articles. More particularly, the invention relates to a method and apparatus for transferring a plastic parison from an extrusion station to a blow molding station, using either the blow molds, preform molds, or both, to transfer the parison, without transferring the mechanism for applying the clamping forces to the molds.

There exist various methods for forming blown thermoplastic articles. In general, one of these methods includes injection molding a parison and then blowing the parison into the completed article. In other methods, an extruded parison is blown into the shape of the final article, either with or without an intermediate blowing step to form a preform, for purposes well known in the art.

These and other methods and devices employ a variety of mechanisms to transfer the molds and the parisons as well as to clamp the molds under high pressure for the blowing operation. Typically, the molds are mounted on tie rods in order to distribute the clamping forces. The use of four or more tie rods would be preferable; however, since it is necessary to move parts into and out of the clamp, such an arrangement is generally not feasible since the tie rods obstruct movement of parts into and out of the clamp area or between the extrusion and molding stations. Thus, clamps have been devised where only two or three tie rods are used, while others have tie rods that mechanically clamp together after a part has passed through. Still other machines use a C-clamp arrangement such that there are no top tie rods.

In most prior devices the blow molds are permanently fastened within the clamps, such that the heavy clamps travel with the molds. For example, in prior extrusion blow molding processes the molds and the heavy hydraulic mechanism for exerting force travel from station to station as the parison is transferred to different processing stations.

These and other devices and methods include certain inherent drawbacks. For example, those prior devices typically cannot employ a sufficient number of tie rods to equally distribute final clamping forces for the blowing operation. Prior devices and methods also require transfer of heavy clamping mechanisms, thus increasing production costs and reducing efficiency. Other devices and methods fail to provide alternate methods of support for the blanks, thus reducing flexibility in handling. Still other devices and methods encounter problems in positioning the blanks in the various stations. Yet others fail to properly control the forces applied in handling the blanks or partially formed parisons thus further reducing flexibility with regard to heat transfer and other process conditions.

SUMMARY OF THE INVENTION

These and other disadvantages of prior devices and methods are overcome by the present invention, which includes a method and apparatus for transferring articles to be molded under pressure. The apparatus includes mold sections which are closeable along a first axis to form a mold cavity and which are also movable along a second axis from a first station where the mold sections may receive a moldable blank to a second station where the blank may be molded under pressure. A stationary clamp that does not move between the first and second stations presses the mold sections together at the second station for molding the blank under pressure. The blank may be an extruded parison to be blow molded in the second station.

Optional biasing means may be provided to hold the mold sections sufficiently close together to hold the blank as the mold sections move from the first station to the second station. Preferably, however, the molds may be closed under a low pressure at the first station and then that pressure is maintained as the molds are moved to the second station, whereupon a greater pressure is applied for the molding operation. Alternatively, the molds may be only partially closed, such that a slight spacing on the order of one-sixteenth inch to one inch is left between the mold sections, until the final closing forces are applied.

In a more detailed aspect, the apparatus includes at least first and second molding stations which are spaced generally along a first axis. A pair of generally parallel clamping plates extend from the first to the second molding stations, but are spaced to be on opposite sides of those stations. Each plate includes a guide surface, upon which is mounted a mold section such that the molding sections can move between the first and second molding stations. Means are provided for moving the molding sections between the first and second molding stations; and additional means are provided for displacing the clamping plates toward and away from each other, so that the clamping plates can selectively open, close or clamp the molding sections.

In an even more detailed aspect, the apparatus further includes four spaced tie rods on which the clamping plates are mounted in order to distribute the clamping forces.

In accordance with the present invention there is also provided a method for transferring articles to be molded in a sealed cavity, including the steps of: transporting mold sections generally along a first axis to a first station; moving the mold sections generally along a second axis while at the first station to close the molds around a blank sufficiently to encapsulate the blank in an interior cavity formed by the mold sections; transporting the blank in the mold cavity to a second station by moving the closed mold sections along said first axis; and exerting a force on the mold sections at the second station to form a proper seal for molding, the force being exerted from a source which is stationary in relation to the first and second stations. The first and second forces may emanate from the same stationary power source.

Another preferred method of operation includes the steps of: transporting a pair of opened blow mold sections to a first station; at least partially closing the blow mold sections around a parison at the first station under a first, force, which force is sufficient to hold the parison within the mold sections; transporting the at least partially closed mold sections with the enclosed parison to a second station while maintaining a force sufficient to transport the parison; and exerting a second force on the blow mold sections at the second station, the second force being substantially greater than the first, such that a proper seal is maintained for a molding operation. In accordance with the invention a single means may effect the closing of the molds and the application of the molding force on the molds which single means is stationary in relation to the first and second stations.

BRIEF DESCRIPTION OF THE DRAWINGS

This invention will further be illustrated by reference to the appended drawings which illustrate a particular embodiment for blow molding thermoplastic articles in accordance with the present invention.

DESCRIPTION OF THE PREFERRED EMBODIMENT

Figure 1:
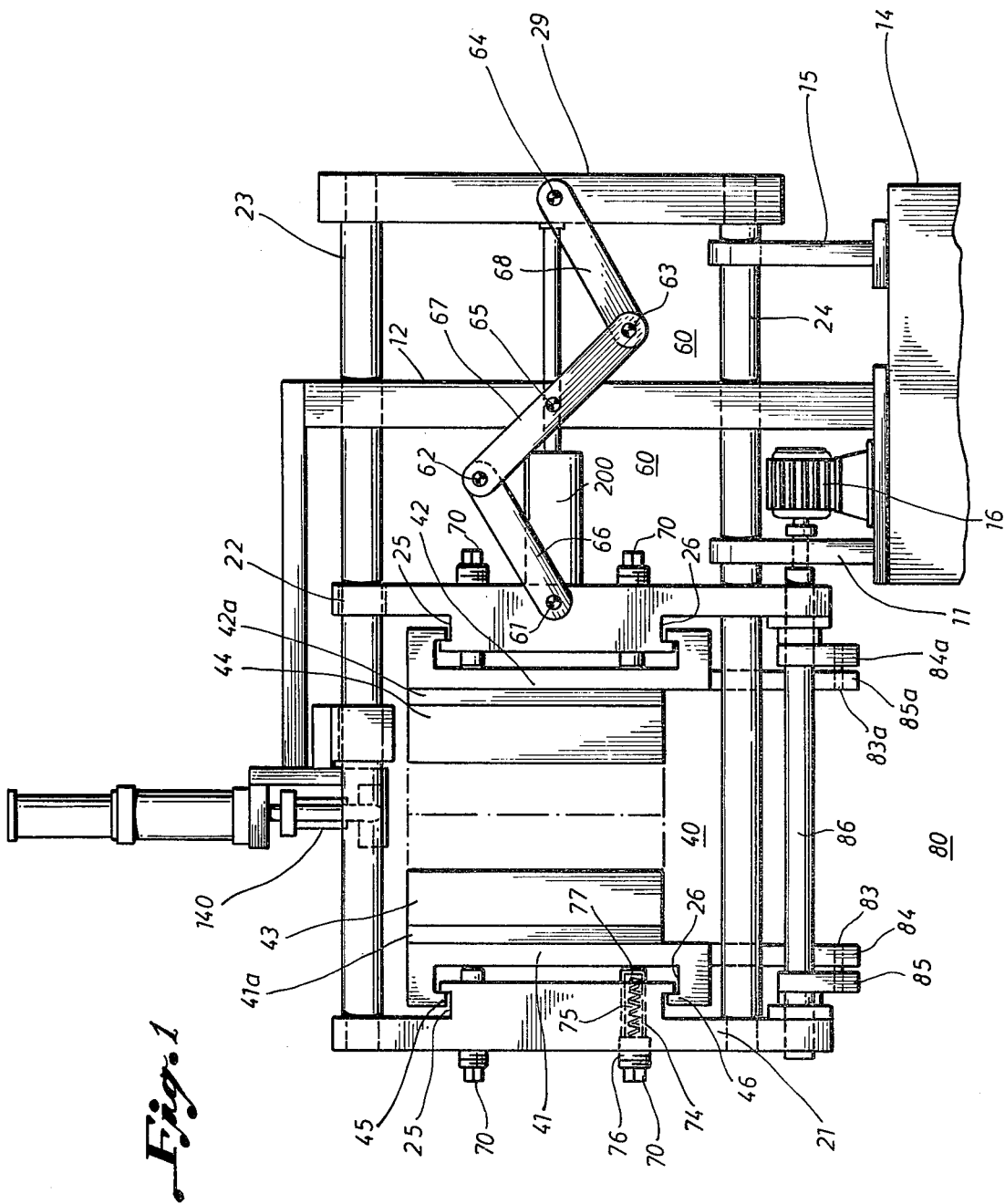
FIG. 1 is a side view of the embodiment of the present invention.

The preferred embodiment is generally represented by a clamp assembly 20, a mold assembly 40, a link mechanism 60, biasing mechanism 70, and a transfer mechanism 80.

Referring now to FIG. 1 there is provided a fixed vertical bar 12 mounted on a base 14. Two vertical tie rod supports 11 and 15 are also mounted on the base 14 as is a motor 16. The vertical tie rod supports 11 and 15 provide support for tie rod or bar 24 which is telescopically mated through the upper portion of the vertical tie rod supports. The tie rod or bar 24 is attached at one end to the lower portion of clamping member 21 and at the other end to the lower portion of a movable bar 29. Another tie rod 23 is attached at one end to the upper portion of clamping member or clamping plate 21 and at the other end to the upper portion of movable bar 29. Both tie rods 23 and 24 are integrally mated to clamping member 21 and movable bar 29 such that the two tie rods, the movable bar 29 and the clamping member 21 move as a unit. Thus, a force exerted against movable bar 29 will cause movement in the clamping member 21.

Clamping member or clamping plate 22 is telescopically mated on the tie rods 23 and 24, such that it is free to move to or away from clamping member 21 in response to the movement of auxiliary link 66 and link mechanism 60.

The clamping members 21 and 22 are provided with a lower recess 26 and an upper recess 25. These recesses are adapted to receive L-shaped extensions 45 and 46 of movable support plates 41 and 42, respectively. The movable support plates 41 and 42 are mounted to move along the face of their respective clamping members.

The L-shaped extensions 45 and 46 are preferably of a smaller diameter than the lower and upper recesses 26 and 25 in order to allow self-adjustment of the movable support plates as the clamping members 21 and 22 are brought together to create a seal, as more fully described later.

Blow mold halves or sections 43 and 44 are integrally mounted on movable support plates 41 and 42, respectivley, through means of spacers 41a and 42a. Thus, each blow mold half or section can slide on an axis parallel to the face of its respective clamping member, yet is mounted so as to respond to the movement of the clamping members to or away from each other and to receive forces exerted by the clamping members.

Although a power source or means of applying force, such as a hydraulic cylinder 200, is attached directly to portions of the clamp assembly such as moveable bar 29 and clamping member 22, the movement of the clamping system is coordinated by a link system 60. That is, link system 60 serves to assure that the clamping plates 21 and 22, and therefore molds 43 and 44, move an equal amount under the force exerted by hydraulic cylinder 200. Thus, the clamping members 21 and 22 are linked to a link mechanism 60 illustrated by the articulated lever system shown in FIG. 1. A main link 67 is pivotally mounted on the fixed bar 12 such that it may pivot on the axis of fixed bar pin 65. The main link 67 is pivotally attached by pin 62 to an auxiliary link 66 on one end and by pin 63 to auxiliary link 68 on the other end. The auxiliary link 66 is in turn pivotally attached to clamping member 22 by means of pin 61, while auxiliary link 68 is pivotally attached to movable bar 29 by means of pin 64. Thus, rotation of main link 67 about fixed bar pin 65 causes auxiliary links 66 and 68 to rotate about pins 62 and 63 respectively so as to force clamping member 22 to move further away or closer to fixed bar 12 depending on the direction of rotation of main link 67 as caused by the back and forth movement of movable bar 29. As can be seen from FIG. 1, clockwise rotation of main link 67 about fixed bar pin 65 results in clamping member 22 and movable bar 29 moving toward each other, while counter clockwise rotation of main link 67 will result in clamping member 22 and movable bar 29 moving away from each other.

The force applying mechanism may alternately be applied to clamping member 22 or movable bar 29. However, in most cases the force applying mechanism is preferably applied to both moveable bar 29 and clamping member 22.

As tie rods 23 and 24 integrally link movable bar 29 and clamping member 21, rotation of main link 67 about fixed bar pin 65 can either increase or reduce the distance between clamping members 21 and 22. Consequently, the distance between blow mold sections 43 and 44 may be controlled by the selective movement of movable bar 29 or clamping member 22. For example, a conventional hydraulic cylinder and piston (shown generally at 200) may be attached between movable bar 29 and clamp 22 to cause bar 29 to move in relation to fixed bar 12. As movable bar 29 is forced away from fixed bar 12 clamping members 21 and 22, and hence blow molds 43 and 44, move closer together. Similarly, as movable bar 29 is forced to move closer to fixed bar 12, the distance between clamping members 21 and 22, and hence the blow mold sections, increases.

Figure 2:
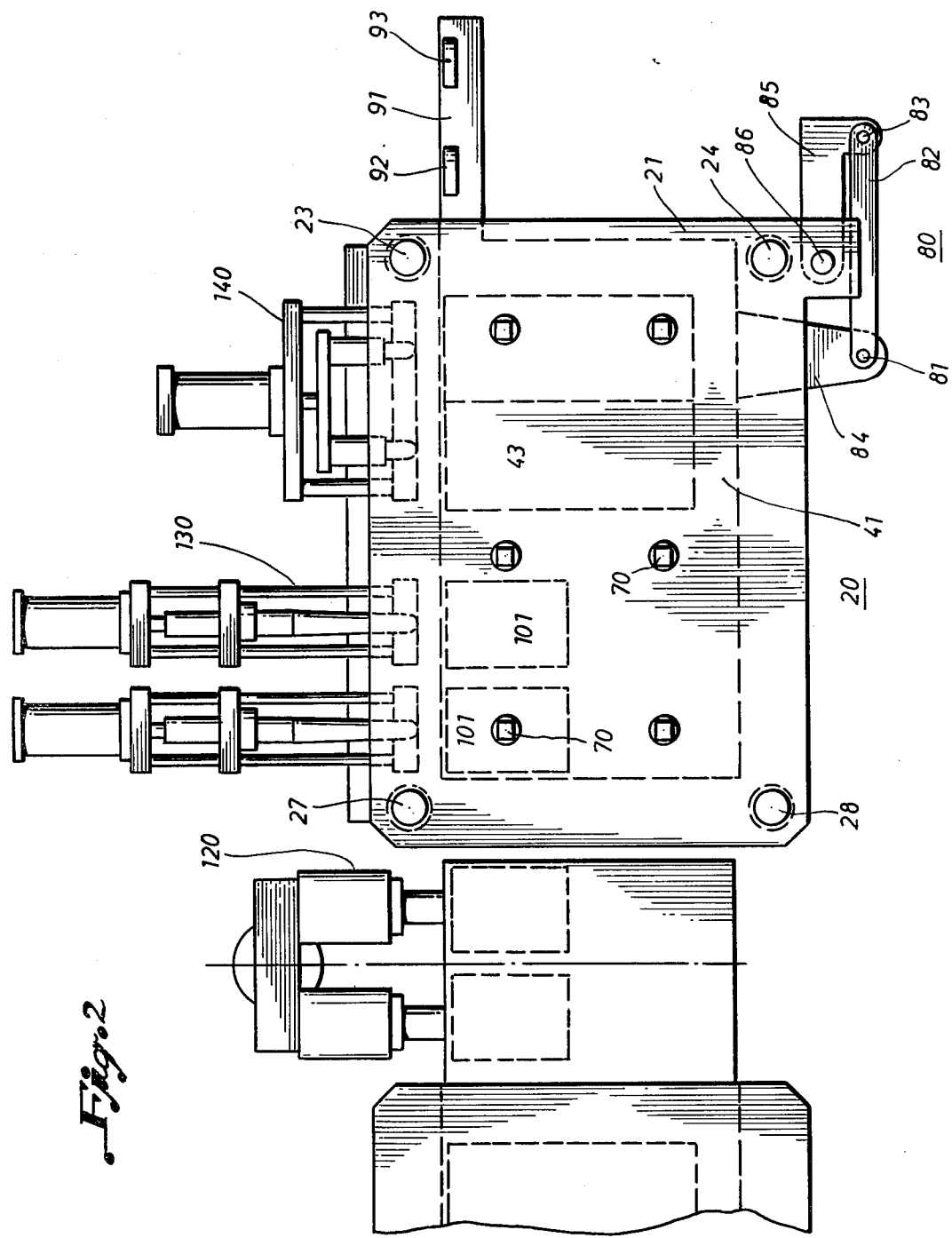
FIG. 2 is a front view of the embodiment shown in FIG. 1.

A transfer mechanism indicated generally at 80 is used to move the mold sections along the clamping members as the mold sections move from one station to the next. Shaft 86 is attached at one end to motor 16 and at the other end is rotatably mounted through clamping member 21. As best illustrated in FIG. 2, swing arm 85 is integrally mounted at one end to shaft 86 and at the other end to link arm 82 by means of link arm pin 83. Thus, rotation of shaft 86 by motor 16 causes swing arm 85 to rotate about the axis of shaft 86. As link arm 82 is connected at its other end to frame 84 by means of link arm pin 81 rotation of shaft 86 causes the lateral movement of frame 84. Since frame 84 is integrally attached to movable support plate 41 rotation of shaft 86 by motor 16 causes movable support plate 41 to move along the face of clamping member 21. A similar mechanism comprising a swing arm, link arm and frame is provided for movable support plate 42, such that rotation of shaft 86 also causes the movement of movable support plate 42 along the face of clamping member 22. Thus, as best shown in FIG. 1, a swing arm 85a is adapted to rotate with shaft 86, thus causing the movement of link arm 82, which is connected to swing arm 85a by link arm pin 83a. This in turn causes the movement of frame 84a which is integrally attached to movable support plate 42. As swing arms 85 and 85a both rotate with shaft 86 movable support plates 41 and 42 move in unison along the faces of clamping members 21 and 22.

As varying forces may be applied to clamping members 21 and 22 and since the distance between the clamping members can be varied to meet process needs, additional biasing means are not generally necessary. In operation, clamping plates are closed on each other under a low pressure to close the mold sections around a parison. Then the molds are transferred with the enclosed parison under the application of the low pressure to a second molding station. Alternatively, the molds may be moved sufficiently close, such as on the order of one-sixteenth inch to an inch, to simply hold the parison in place as the molds are moved between molding stations. Alternatively, clamping members 21 and 22 may be provided with optional biasing means shown generally at 70. Referring again to FIG. 1, a cup shaped plunger 77 is integrally attached by means of a shaft 74 to a plug 76. A spring 75 biases the plunger 77 away from clamping member 21 and up against the inside portion of movable support plate 41. Plug 76 may be adjusted so as to retract or extend plunger 77.

As indicated in both FIGS. 1 and 2 a plurality of biasing means 70 may be provided for each clamping member. Thus, the adjustment of the various plugs 76 causes cup shaped plungers 77 to press against movable support plates 41 and 42 with varying degrees of force. Depending on the number of biasing means 70 the force exerted against movable support plates 41 and 42 may be varied as they travel along the face of clamping members 21 and 22, respectively.

As shown in FIG. 2 clamping member 21 is provided with additional tie bars 27 and 28, which serve the same function as their counterparts, bars 23 and 24. Tie rods 28 and 27 are mounted in a similar fashion as tie rods 23 and 24. Thus, they are telescopically mated with the upper and lower portions of clamping member 22 and are mounted at the end furthest away from clamp 21 to movable bar 29. An additional linking mechanism such as the articulated lever system shown generally at 60 may also be used. For example, a rectangular shaped frame could be provided, the vertical portions of which would be integrally mounted to tie rods 23, 24, 27 and 28. Two articulated lever systems could be installed, both of which would be attached to the vertical sides of the frame in the manner shown in FIG. 1. A hydraulic cylinder could be attached to the frame, such that movement of the frame closer to or further away from fixed bar 12 would increase or decrease the distance between clamping member 21 and clamping member 22.

As one of ordinary skill in the art would appreciate many variations on this theme are possible. For example, the articulated lever system could be mounted such that auxiliary link arm 68 would be attached to the center of the frame, while the tie rods 23, 24, 27 and 28 could be mounted at the four corners of the frame. When the articulated lever system is mainly used to assure cooperation between the movement of movable bar 29 or an appropriate frame (not shown) and clamping member 22 the use of only one articullated lever system may be appropriate.

The movable support plate may be provided with a transport arm 91 as shown in FIG. 2. The transport arm 91 may be provided with carriers 92 and 93 which are adapted to support items being transferred from the blow mold halves or sections. The transport arm provides greater flexibility in integrating the system of the present invention with other processes. For example, these carriers on the transport arm can be used in conjunction with mandrels to be inserted into the blown bottles, much in the same manner as the blow pins, for cooling or filling the blown bottles.

Operation of the foregoing apparatus will now be described in terms of the blow molding of a thermoplastic parison, though it is to be understood that the inventive concept may be used with a wide variety of molding processes as well as other methods. Just prior to the extrusion of a thermoplastic blank or parison from extruder head 120, motor 16 rotates shaft 86 thus causing swing arms 85 and 85a to rotate such that frames 84 and 84a move toward the extrusion head 120 due to the movement of link arms 82 and 82a, respectively. The movement of frames 84 and 84a causes movable support plates 41 and 42 to move along clamping members 21 and 22, respectively. As preform molds such as 101 are mounted in much the same fashion as blow mold halves or sections 43 and 44, the preform molds are transferred to a location under the extrusion head such that they are located on opposite sides of the extruded parison. Hydraulic cylinder 200 is then activated to extend its associated piston rod, causing the clamping members 21 and 22 and hence the preform molds towards each other.

The preform molds may be provided with a pair of pinching members as more fully described in U.S. application Ser. No. 097,230 filed Nov. 26, 1979, now U.S. Pat. No. 4,315,888, by the inventor and herein incorporated by reference. Thus, as the preform mold sections close about the extruded parison, they pinch it off at one end. The pressure applied by hydraulic ram 200 can be selected as desired to either apply a low pressure to the molds or to sufficiently close them in order to hold the parison internally of the cavity.

Motor 16 again rotates shaft 86, but this time in the opposite direction thus transferring the preform molds from under the extrusion head to a point where core pins are inserted from unit 130. A greater force is now exerted against moveable bar 29 and a core pin is inserted into the parison. The movable bar 29 is then retracted, thus causing the clamping members 21 and 22 to separate, and so leaving the preform pendantly supported on the core pin. Motor 16 once again rotates shaft 86 thus causing the preform molds to move back under the extruder head and the movable support plates 41 and 42 to move the blow mold halves or sections 43 and 44 to the positions previously occupied by the preform molds. Hydraulic pressure is once again supplied by ram 200, causing the preform molds to close on another parison and causing the blow molds to close on the preforms supported by the core pins. The core pin is then retracted, leaving the preform in the blow mold. Then, the mold sections are returned to their previous location. As before, the movement of the support plates and hence the blow mold along the face of the clamping members is controlled by the rotation of shaft 86.

Once the blow mold halves or sections are under the blow heads 140, the blow pins are inserted into the open end of the preforms while at about the same time the core pins are being inserted into the parisons at the preform station. Additional force is exerted against movable bar 29 and hence clamping members 21 and 22 such that the blow mold halves or sections are sealed under high pressure. Of course, at the same time a higher pressure is being applied to the preform molds by the clamping plates under the force applied by hydraulic ram 200. A blow molding operation is then performed wherein the preform is expanded into the shape of the blow mold cavity, as, for example, described in the inventor's U.S. patent application Ser. No. 097,230, now U.S. Pat. No. 4,315,888, herein incorporated by reference. Once the blow molding operation molds are moved apart, leaving the blown bottle suspended on the blow pin and the preform supported on the core pin. Then, the prior operation is repeated, with the addition that the carrier 92 closes on the neck of the blown bottle as the blow mold closes on a preform and the preform mold closes on a parison. The blown bottle is left in the closed carrier by retracting the blow pin. The blown article can then be processed by cooling or filling at subsequent stations by additional core pins, or can be dropped onto a conveyor or in a collection bin when the carriers open as the clamping plates are opened as in the above described sequence.

As indicated in FIG. 2 each of the clamping members may be provided with a plurality of blow molds and preform molds. Thus, two parisons or preforms are transferred at any given time. Similarly, the present invention may be used with the integrated system described in the previously referenced patent application of the inventor or only in that portion of the system traversed by the blow molds, that is, the preform station is optional.

A wide variety of alternative embodiments are possible within the spirit and framework of the present invention. For example, any number of tie rods may be used as long as they are of sufficient length and number to cause the clamping members to form a proper seal when needed, such as for blow molding. In blow molding operations it is preferable to use at least four tie rods which surround the mold section and which are unbroken along their length. If fewer than four tie rods are used or if the tie rods do not surround the mold section the clamping members do not exert as uniform force on the blow mold sections or halves. If the tie rods are broken along their length, such that the mechanical means must be used to link one end of the tie rod to the other, reduced wearability results.

As already indicated, in accordance with the present invention the hydraulic cylinder or other force inducing means may be attached to movable bar 29. However, it may also act directly on clamping member 22, since the articulated lever system serves to coordinate the movement of the clamping members and the movable bar. However, in accordance with the present invention, it is unnecessary and undesirable to move the hydraulic cylinder or other means of applying force since the force exerted on any one portion of the clamping member is transferred through the movable support plates to the mold sections which slide along the face of each clamping member. Similarly, the clamping members also remain stationary in the direction of the axis going through the various molding stations.

The clamping members should be made of sufficiently strong material to withstand the varied process pressures and insure proper sealing as required. The bending movement of the clamps will generally be minimal. However, the thickness or strength of the clamps may vary depending on the location of the tie rods and other factors known to those skilled in the art.

Many advantages result because of the stationary nature of the clamping system. For example, since the clamps do not move along with the molds from station to station, parts can be held from the top or bottom during the time the molds are open, because the tie bars do not move across the holding member. Thus, parts can be shuttled in and out of the clamp by supporting the parts first by the mold and then by a support means, which for example may support the article from the top or bottom. By alternating the support of the part between the mold and the support, greater flexibility in handling can be achieved. Additionally, a solid tie bar clamping system can be employed, since at least four unbroken tie rods can be used to surround the mold sections. Additionally, energy and time as well as wear and tear on machinery are saved by virtue of the fact that the clamping system including a hydraulic cylinder or like means does not have to be shuttled along with the mold sections.

As indicated, the present inventive concept may be used with a variety of processes or variations on the specific process described. For example, a large clamp may be employed to cover several stations. Similarly, the clamps may be employed to cover only two stations, thus providing the means for transferring an item from one station to a blow mold station and there providing a proper seal.

The present inventive concept not only reduces process inefficiencies, but can also result in a generally superior product. For example, use of a more uniform clamp in blow molding provides a tighter seal and hence may reduce the number of defectively blown products.

Thus, one who is skilled in the art and has the benefit of this disclosure can see a number of advantages to use of the present inventive concept by the provision of a stationary clamping member and a stationary force transferring member.

The instant invention has been disclosed in connection with specific embodiments. However, it will be understood by those skilled in the art that variations of the illustrated embodiment may be undertaken without departing from the spirit and scope of the invention. Accordingly, this description is to be construed as illustrative only and as for the purpose of teaching those skilled in the art the manner of carrying out the invention. It is to be understood that the forms of the invention herewith shown and described are to be taken as the presently preferred embodiments. Various changes may be made in the size, shape and arrangement of parts. For example, equivalent elements or materials may be substituted for those illustrated and described herein, parts may be reversed, and certain features of the invention may be utilized independently of the use of other features. All this would be apparent to one skilled in the art after having the benefit of this description of the invention.

What is claimed is:

1. A method for transferring articles to be molded in a sealed cavity comprising the steps of:
   (a) transporting mold sections along a first essentially linear axis to a first station;
   (b) with a power source which is fixed relative to the movement of the mold sections along said first axis, moving the mold sections along a second essentially linear axis which is generally perpendicular to said first axis while at the first station to at least substantially close the molds around a blank sufficiently to encapsulate the blank in an interior cavity formed by the mold sections;

(c) transporting the blank in the mold cavity to a second station by moving the closed mold sections along said first axis; and (d) applying force to said mold sections at said second station with said power source to assure an appropriate seal for a molding operation; and (e) opening said mold sections at said second station with said power source along a third axis which is generally parallel to said second axis.

2. The method of claim 1 wherein the blank comprises a parison to be blow molded in the second station.

3. The method of claim 1 characterized by biasing the molds to a closed position by biasing means, while the mold sections are transported to the second station.

4. In a method for forming a thermoplastic article, the steps of:
(a) extruding a parison of thermoplastic material at a first station;
(b) transporting sections of a mold along a first generally linear axis to the first station;
(c) at least substantially closing the mold sections around a parison at the first station along a second generally linear axis which is essentially perpendicular to said first axis, with a power source which is fixed relative to the movement of the mold sections along said first axis;
(d) transferring the parison in the cavity along said first axis to a second station; and
(e) exerting a force on the mold sections at the second station to hold the mold sections closed for a molding operation, the application of the molding force being applied by said power source; and
(f) opening said mold sections at the second station by said power source.

5. The method of claim 4, wherein the mold sections form a preform mold cavity, and further including the steps of:
(a) at said second station, inserting a core pin into the open end of the parison to form a preform;
(b) opening the preform mold sections and retaining the preform on the core pin at the second station;
(c) transporting sections of a blow mold to the second station while transferring the preform mold sections to the first station;
(d) with said power source, sufficiently closing the blow mold sections at the second station to hold the preform in a blow cavity formed by the closed sections;
(e) retracting the core pin to leave the preform within the closed blow mold sections;
(f) transferring the preform in the blow mold sections to a third station; and
(g) with said power source, exerting a force on the blow mold sections at the third station to form a proper seal for blow molding.

* * * * *